United States Patent
Zhang

(10) Patent No.: US 9,102,473 B2
(45) Date of Patent: Aug. 11, 2015

(54) SIMPLE SUSPENSION BRIDGE TYPE BELT CONVEYOR

(75) Inventor: Zhilin Zhang, Suzhou (CN)

(73) Assignee: Cable Bridge Conveyor, LLC, Bellingham, WA (US)

( * ) Notice: Subject to any disclaimer, the term of this patent is extended or adjusted under 35 U.S.C. 154(b) by 0 days.

(21) Appl. No.: 14/356,117

(22) PCT Filed: May 23, 2012

(86) PCT No.: PCT/CN2012/075964
§ 371 (c)(1),
(2), (4) Date: May 2, 2014

(87) PCT Pub. No.: WO2013/067808
PCT Pub. Date: May 16, 2013

(65) Prior Publication Data
US 2014/0284184 A1    Sep. 25, 2014

(30) Foreign Application Priority Data
Nov. 11, 2011    (CN) .......................... 2011 1 0356125

(51) Int. Cl.
| | |
|---|---|
| *B65G 15/60* | (2006.01) |
| *B65G 21/00* | (2006.01) |
| *B65G 15/08* | (2006.01) |
| *B65G 39/10* | (2006.01) |

(52) U.S. Cl.
CPC ............... *B65G 15/60* (2013.01); *B65G 15/08* (2013.01); *B65G 21/00* (2013.01); *B65G 39/10* (2013.01)

(58) Field of Classification Search
CPC ........ B65G 15/08; B65G 15/60; B65G 21/00; B65G 39/10

USPC ......... 198/818, 819, 823, 824, 825, 827, 830, 198/837, 838, 860.1, 860.3
See application file for complete search history.

(56) References Cited

U.S. PATENT DOCUMENTS

| | | | | |
|---|---|---|---|---|
| 2,773,257 A | * | 12/1956 | Craggs et al. .................. | 198/808 |
| 2,793,738 A | * | 5/1957 | Erickson .................... | 198/860.1 |
| 2,907,448 A | * | 10/1959 | Gleeson ........................ | 198/827 |
| 3,106,284 A | * | 10/1963 | Craggs et al. .................. | 198/827 |
| 3,124,238 A | * | 3/1964 | Tyler .............................. | 198/827 |
| 3,225,899 A | * | 12/1965 | Lo Presti et al. ............... | 198/827 |
| 3,324,806 A | * | 6/1967 | Olsen ........................... | 198/819 |
| 4,714,151 A | * | 12/1987 | Campbell et al. .......... | 198/860.5 |
| 5,193,663 A | * | 3/1993 | Kuroda ......................... | 198/819 |
| 5,246,102 A | * | 9/1993 | Rappen et al. .............. | 198/860.2 |

(Continued)

*Primary Examiner* — Leslie A Nicholson, III
*Assistant Examiner* — Keith R Campbell
(74) *Attorney, Agent, or Firm* — Paul B. Heynssens; Ater Wynne LLP

(57) ABSTRACT

The present invention provides a simple suspension bridge type belt conveyor, which includes a simple suspension bridge body, a conveyor belt, a trough support roller apparatus and a circular support roller apparatus. There are multiple supporting pillars beneath the simple suspension bridge body. The trough support rollers apparatus and the circular support roller apparatus are fixed on the simple suspension bridge body. The conveyor conveys materials on the conveyor belt, which is moving through the trough support rollers apparatus and the circular support roller apparatus. By means of aforementioned way, the simple suspension bridge type belt conveyor with respect to the present invention, is able to make the conveyor belt pass over the pillars of simple suspension bridge without overstressing the conveyor belt, and has lower manufacturing cost and higher conveying efficiency.

7 Claims, 3 Drawing Sheets

(56) References Cited

U.S. PATENT DOCUMENTS

| | | | |
|---|---|---|---|
| 5,791,454 A * | 8/1998 | Trieb | 198/699 |
| 6,276,521 B1 * | 8/2001 | Arndt et al. | 198/860.2 |
| 6,863,174 B1 * | 3/2005 | Trieb | 198/838 |
| 7,866,463 B2 * | 1/2011 | Brunone | 198/819 |
| 8,763,791 B2 * | 7/2014 | Conroy et al. | 198/819 |

* cited by examiner

SIMPLE SUSPENSION BRIDGE TYPE BELT CONVEYOR

TECHNICAL FIELD

The present invention relates to technical fields with respect to bridges and material handling and in particular, relates to a simple suspension bridge belt conveyor.

BACKGROUND

The simple suspension bridge is a kind of suspension bridge where the bridge body is hung from steel cables or steel wireropes that are supported on pillars separated by a certain distance. The belt conveyor is a conveying machine of which a continuously cycling endless conveyor belt for carrying materials is supported by carry rollers separated by a certain distance. The belt conveyor is also called as the conveyor (hereinafter, simply called as conveyor), and applied to fields such as mining, ports, factories and other areas where material handling is needed. The conveyor has advantages like lower cost, less environmental impact and higher energy efficiency, comparing to material handling by motor vehicles.

The conveyor can be placed on the ground or elevated above the ground on support structures. Ground based conveyor occupies massive land areas along the conveying route and also blocks the traffic on either side of the conveyor. Mounting the conveyor on support structures higher than the ground can reduce land areas occupied by the conveyor, provide better traffic access, and enhance safety. Traditional support structure is either steel trestle or concrete gallery. The traditional support method has drawbacks like high cost, short pillar spacing, and difficult to implement in difficult terrain or crossing existing building structures.

The simple suspension bridge, suspension bridge and cable-stayed bridge are different bridge structures that can be used to support conveyors and achieve long pillar spacing. However, the suspension bridge and the cable-stayed bridge need huge pillars which tower above the bridge body significantly. With the steel ropes or steel cables suspended from the top of pillars, and the bridge body suspended underneath the steel ropes or steel cables, the cost is high. The simple suspension bridge does not need large high pillars. But its bridge body has a near-catenary curve. The slope of the curve is changed suddenly near the top of the pillar. This characteristic makes a conveyor unsuitable to be mounted on the simple suspension bridge directly.

SUMMARY OF THE INVENTION

The main purpose of the present invention is to provide a simple suspension bridge type belt conveyor that can make the conveyor belt pass through pillars of the simple suspension bridge smoothly, which has the benefit of lower manufacturing cost and higher conveying efficiency.

In order to solve aforementioned problem, one solution of the present invention provides a simple suspension bridge type belt conveyor which comprises a simple suspension bridge body, a conveyor belt, a trough support rollers apparatus and a circular support roller apparatus. There are a plurality of supporting pillars beneath said simple suspension bridge body, the trough support rollers apparatus and the circular support roller apparatus are fixed on the top of the suspension bridge body, the conveyor belt conveys materials through the trough support rollers apparatus and the circular support roller apparatus.

In one preferred embodiment of the present invention, said bridge body on top of the pillar comprises a cross beam, a plurality of bridge body steel cables and edge steel cables, both ends of the cross beam are connected to the edge steel cables, the center part of the cross beam is connected to the bridge body steel cables.

In one preferred embodiment of the present invention, adjacent to the simple suspension bridge pillars, the curve of the conveyor belt on the trough support rollers apparatus and the circular support roller apparatus is a curve shape that is appropriate for the conveyor belt to pass the pillars and does not coincide with the curve of the simple suspension bridge body.

In one preferred embodiment of the present invention, the included angle between the arm of the cross beam on the end of which supports the edge steel cables and a plane extending from the center of the cross beam where the bridge body steel cables are located, is an acute angle or a right angle.

In one preferred embodiment of the present invention, the trough support rollers apparatus comprises a first carrier roller and a first roller bracket, the trough support rollers apparatus is mounted on the bridge floor supported by the cross beam, or is mounted on the cross beam directly.

In one preferred embodiment of the present invention, the circular support roller apparatus comprises a second carrier roller and a second roller bracket, the circular support roller apparatus is mounted on the bridge floor supported by the cross beam, or is mounted on the cross beam directly.

In one preferred embodiment of the present invention, a walkway and a maintenance vehicle are provided on top of the simple suspension bridge body.

In one preferred embodiment of the present invention, the conveyor belts can be supported by the trough support rollers apparatus and the circular support roller apparatus in an alternating way or in a parallel way.

In one preferred embodiment of the present invention, two or more conveyor belts are provided on the top of the simple suspension bridge body.

The advantages of the present invention: by implementing the simple suspension bridge type belt conveyor of the present invention, the deficiencies such as short pillar spacing with respect to the traditional structures of the steel trestle and concrete gallery, higher structure weight, are improved by mounting the conveyor on the simple suspension bridge. Other deficiency such as, the suspension bridge and the cable-stayed bridge must have huge pillars that tower above the bridge body, is also improved. A deficiency in which the curve of bridge body adjacent to the pillars of the suspension bridge is unsuitable for the installation of conveyor, is solved by changing the curve of the conveyor through adjusting height of the carrier roller and the roller bracket. The simple suspension bridge type belt conveyor has lower manufacture cost and higher transportation efficiency.

Figure 1:
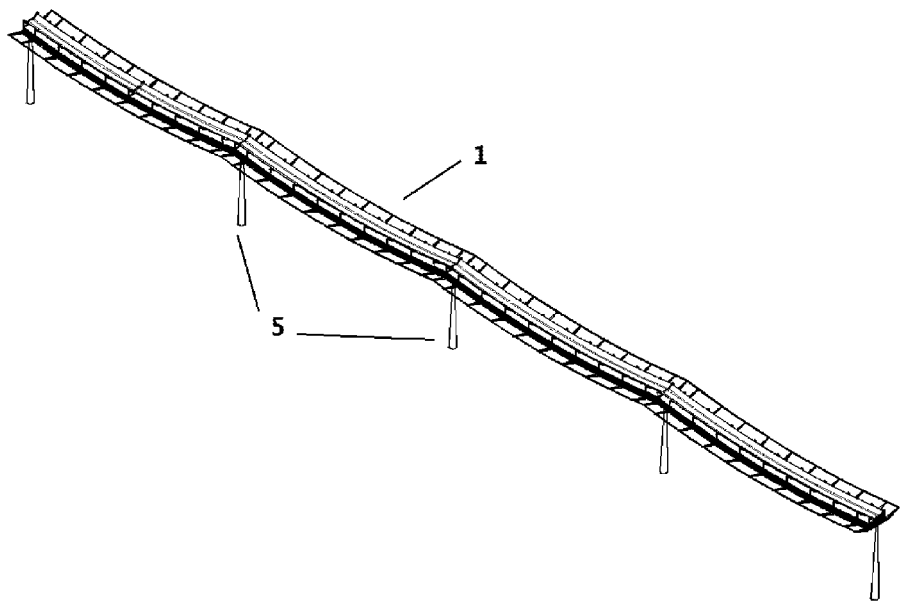
FIG. 1 shows a schematic isometric view of the structure of the simple suspension bridge type belt conveyor according to one preferred embodiment of the present invention.

The reference numbers of each part in the figures are as follows:

1. simple suspension bridge body; 2. conveyor belt; 3. trough support rollers apparatus; 4. circular support roller apparatus; 5. pillar; 6. walkway; 7. maintenance vehicle; 16. conveyor belt curve; 17. simple suspension bridge body curve; 21. edge steel cable; 22. bridge body steel cable; 23. cross beam; 24. cross beam arm; 31. a first carrier roller; 32. a first roller bracket; 41. a second carrier roller; 42. a second roller bracket.

DETAILED DESCRIPTION OF EMBODIMENT

Hereinafter, preferred embodiments of the present invention will be introduced in details, in order to help a person skilled in the art easily understand the advantages and characteristics of the present invention.

As FIGS. 1, 2, 3, 4 and 5 show, an embodiment of the present invention includes a simple suspension bridge type belt conveyor which comprises a simple suspension bridge body 1, a conveyor belt 2, a trough support rollers apparatus 3, a circular support roller apparatus 4. The floor of the simple suspension bridge body 1 is provided with a plurality of pillars 5. The trough support rollers apparatus 3 and the circular support roller apparatus 4 are fixed on upper end of the bridge body 1. The conveyor belt 2 conveys materials through the trough support rollers apparatus 3 and the circular support roller apparatus 4. The bridge body 1 comprises a cross beam 23, a plurality of bridge body steel cables 22 that are located at the center of the bridge, and edge steel cables 21. In terms of length and width of the bridge body, the cross beam 23 is connected with plurality of edge steel cables 21. A plurality of bridge body steel cables 22 is connected to middle part of the cross beam 23 in series for bearing the weight of the conveyor and the bridge body.

Figure 2:
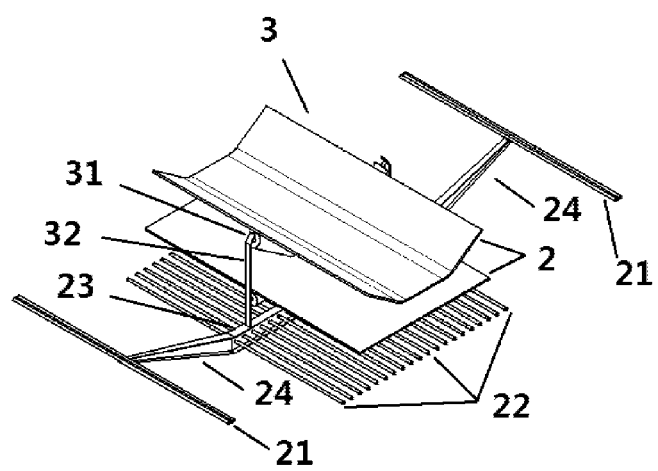
FIG. 2 shows a schematic isometric view of the structure of trough support rollers apparatus in the simple suspension bridge type belt conveyor according to the present invention.
Figure 3:
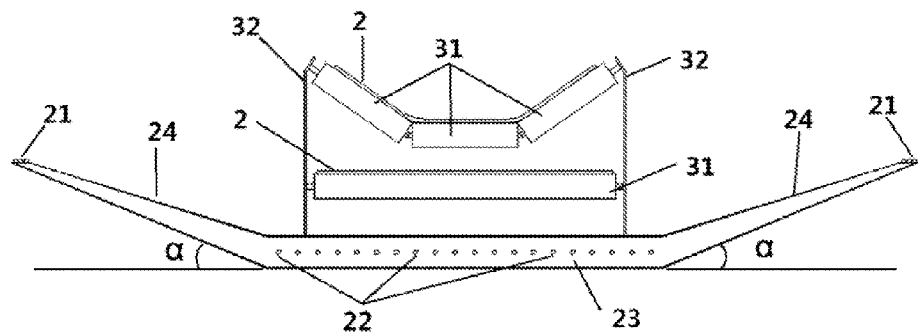
FIG. 3 shows a front view of the structure of the trough support rollers apparatus.

As FIGS. 2 and 3 shown, the trough support rollers apparatus 3 has a first carrier roller 31 and a first roller bracket 32. The first carrier roller 31 is mounted on the first roller brackets 32 which are mounted on the bridge floor supported by the cross beam 23, or mounted on the cross beam 23 directly. Specifically, three first carrier rollers 31 on upper end of the first roller bracket 32 are arranged to form a trough profile. When a conveyor belt 2 loading with materials goes through the trough support roller apparatus 3, the conveyor belt 2 is formed as a trough profile. After material unloading, the return part of the conveyor belt 2 is a flat plane profile.

Figure 4:
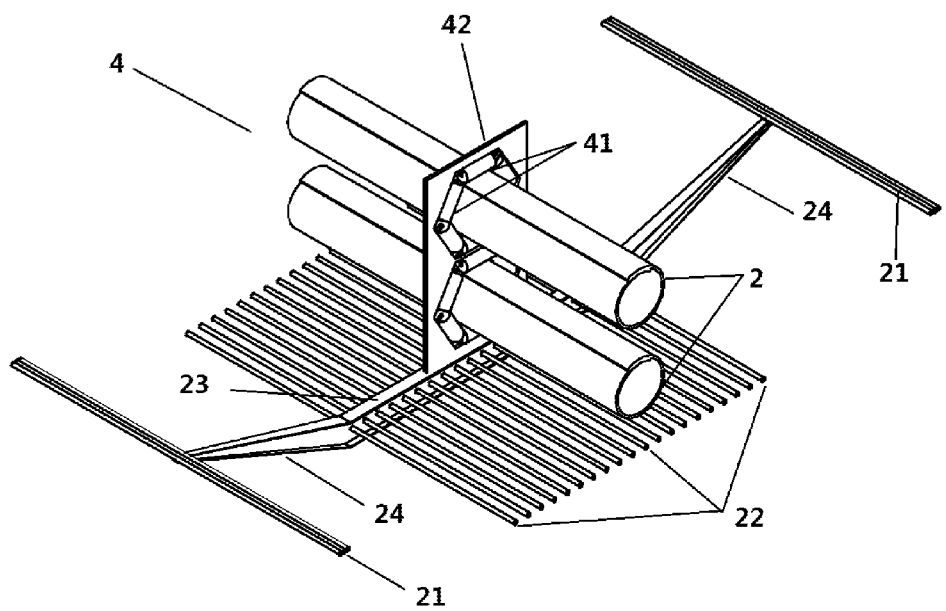
FIG. 4 shows a schematic isometric view of the structure of circular support roller apparatus in the simple suspension bridge type belt conveyor according to the present invention.
Figure 5:
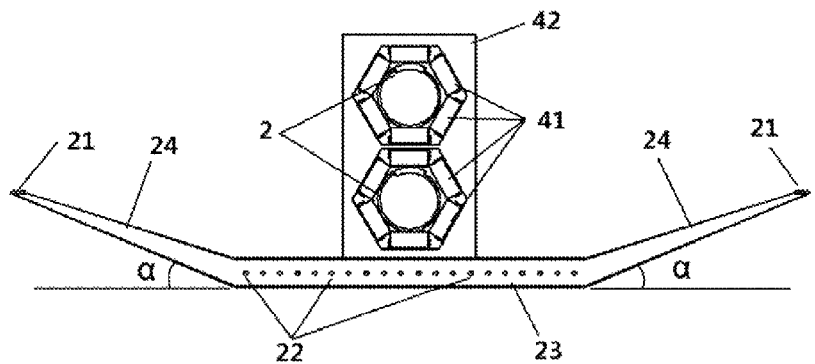
FIG. 5 shows a front view of the structure of the circular support roller apparatus.

As FIGS. 4 and 5 shown, the circular support roller apparatus 4 comprises a second carrier roller 41 and a second roller bracket 42. The second carrier roller 41 is mounted inside the second roller bracket 42 which is mounted on the bridge floor supported by the cross beams 23, or is mounted on the cross beam 23 directly. Specifically, there are two circles, upper and lower, formed by six second carrier rollers 41. When the conveyor belt 2 loading with materials goes through the circular support roller apparatus 4, the conveyor belt 2 presents a tubular profile. After material unloading, the return part of the conveyor belt 2 presents a tubular profile as well.

Further, as FIGS. 3 and 5 shown, included angle α between the cross beam arm 24 for supporting the edge steel cables 21 and a plane extending from the cross beam 23 for loading the bridge body steel cables 22 is an acute angle or a right angle. Depending on the weight of the conveyor and pillar intervals of the simple suspension bridge, the included angle may be chosen among different values.

Figure 6:
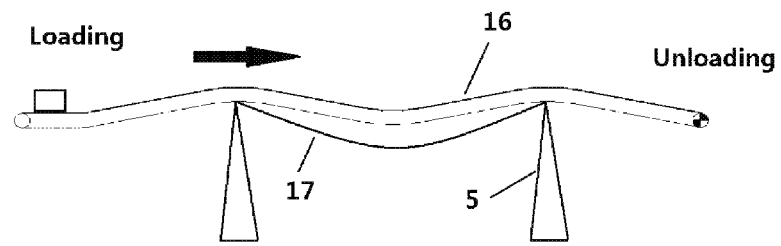
FIG. 6 shows a schematic view of conveyor belt curve and simple suspension bridge body curve.

As FIG. 6 shown, it can be seen from the conveyor belt curve 16 and the simple suspension bridge body curve 17 that the conveyor belt does not coincide with the simple suspension bridge body adjacent to the pillar 5. The conveyor belt curve can be changed by adjusting height of the carrier roller and the roller bracket, so as to solve the problem that the conveyor belt is not able to run along the bridge body curve adjacent to the pillar 5 of the simple suspension bridge.

Figure 7:
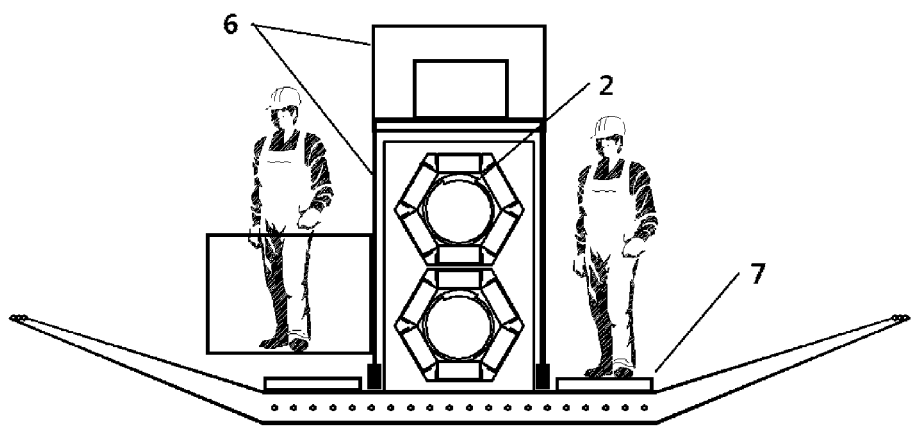
FIG. 7 shows a schematic view of the structure of a walkway and a maintenance machine in the belt conveyor for a simple suspension bridge according to the present invention.

Furthermore, the conveyor belt 2 supported by the trough support rollers apparatus 3 and the circular support roller apparatus 4 may have alternative loading modes, i.e. a section of conveyor belt 2 supported by the trough support rollers apparatus 3 may have a trough profile for carrying material, conveyor belt 2 supported by the circular support roller apparatus 4 may have a tubular profile for carrying material, and so on. The conveyor belt may also only be supported by the trough support rollers apparatus 3 or the circular support roller apparatus 4. The simple suspension bridge body 1 may be provided with two or more conveyor belts 2. As FIG. 7 shown, according to the simple suspension bridge type belt conveyor, the upper end of the simple suspension bridge body 1 is also provided with a walkway 6 or a mobile maintenance vehicle 7, or provided with both. The maintenance vehicle 7 passes through the upper side of conveyor belt 2 so as to check and maintain the conveyor.

With respect to the simple suspension bridge type belt conveyor of the present invention, the principle of operation is as follows: the endless conveyor belt 2 is formed as a trough profile or a round tubular profile on the trough support rollers apparatus 3 and the circular support roller apparatus 4 which are at intervals, and the conveyor belt 2 loads materials. While the conveyor belt 2 is running, the carrier rollers revolve on their respective axis, but do not move along with the conveyor belt 2. One end of the conveyor belt 2 receives materials, the other end discharges materials. The conveyor belt 2 is driven by electric motors.

According to the simple suspension bridge type belt conveyor of the present invention, the difference from the prior art is as follows: in the prior art, installing a conveyor on a rigid structure, such as steel trestle or concrete gallery, retains high cost and is limited by the topography. Bridges with large pillar span, such as suspension bridge or cable-stayed bridge, need huge pillars to support steel cables, and the bridge body is suspended under the steel cables. Mounting the simple suspension bridge directly on the suspended steel cables does not need huge pillars, and has advantages like easy installation and lower cost. The conveyor belt curve is adjusted by the carrier roller and the roller bracket so as to form a curve suitable for passing through simple suspension bridge pillar.

The foregoing description is of the best mode presently contemplated of carrying out the invention. This description is in no way meant to be limiting, but rather should be taken as illustrative of the general principles of the invention. It should be understood that various changes and modifications may be made thereto without departing from the scope of the invention.

The invention claimed is:

1. A simple suspension bridge conveyor, characterized in that, it comprises:
   a simple suspension bridge body;
   a conveyor belt;
   a trough support rollers apparatus; and
   a circular support roller apparatus, wherein, there are a plurality of supporting pillars beneath said simple suspension bridge body, said trough support rollers apparatus and said circular support roller apparatus are fixed above the simple suspension bridge body, and said conveyor belt conveys materials through the said trough support rollers apparatus and said circular support roller apparatus, and wherein;

said bridge body on top of said pillar, comprises:

a cross beam;

a plurality of bridge body steel cables; and a plurality of edge steel cables, wherein:

both ends of said cross beam are connected to said edge steel cables; and the center part of said cross beam is connected to the said bridge body steel cables.

2. The simple suspension bridge conveyor according to claim 1, characterized in that, adjacent to the simple suspension bridge pillars, the curve of said conveyor belt on said trough support rollers apparatus and said circular support roller apparatus is a curve shape which is appropriate for said conveyor belt to pass the pillars, and does not coincide with the curve of the simple suspension bridge body.

3. The simple suspension bridge conveyor according to claim 1, characterized in that, the included angle between the arm of the cross beam on the end of which supports the edge steel cables, and the plane extending from the center of the cross beam where the bridge body steel cables are located, is an acute angle or a right angle.

4. The simple suspension bridge conveyor according to claim 1, characterized in that, said trough support rollers apparatus comprises a first carry roller and a first roller bracket, said trough support rollers apparatus is mounted on the bridge floor supported by said cross beam, or is mounted on said cross beam directly.

5. The simple suspension bridge conveyor according to claim 1, characterized in that, said circular support roller apparatus comprises a second carry roller and a second roller bracket, said circular support roller apparatus is mounted on the bridge floor supported by said cross beam, or is mounted on said cross beam directly.

6. The simple suspension bridge conveyor according to claim 1, characterized in that, a walkway and a maintenance vehicle are provided on top of the simple suspension bridge body.

7. The simple suspension bridge conveyor according to claim 1, characterized in that, two or more conveyor belts are located on the simple suspension bridge body.

* * * * *